UNITED STATES PATENT OFFICE

ARNOLD M. COLLINS, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITIONS AND ARTICLES COATED THEREWITH

No Drawing.  Application filed August 7, 1929.  Serial No. 384,239.

This invention relates to the art of coating compositions and, more particularly, to coating compositions containing synthetic drying oils and articles coated therewith.

Although drying oils, such as linseed and China wood oil, and varnishes made from them, yield films of excellent flexibility, adhesion, durability, and resistance to the action of water, these oils and varnishes dry and harden too slowly to be advantageously used for many purposes where speed is an important consideration. Accordingly, they are being replaced, to some extent, by nitrocellulose lacquers which, however, have the disadvantage of being more costly. Furthermore, since the drying oils now known are all derived from vegetable or animal products, many of which are brought from foreign countries, their cost and availability are subject to considerable variation.

I have found that polymers of highly unsaturated hydrocarbons, such as divinyl acetylene, have the general characteristics of drying oil but possess numerous advantages thereover, and may be used to form coating compositions which are superior to those heretofore in use.

It is therefore an object of my invention to provide new and improved coating compositions.

It is another object of my invention to provide coating compositions which are completely resistant to the action of water, organic solvents, strong acids and alkalies.

It is a further object of my invention to provide articles coated with my new coating compositions.

With the above and other objects in view, which will be apparent as the description proceeds, I have set forth my invention in the following specification and have included the following examples by way of illustration and not as a limitation.

*Example 1*

A polymerization product of a mixture of divinyl acetylene and a tetramer of acetylene is used directly, or after dilution with up to 50% of xylene, as a coating composition. The resulting films possess satisfactory flexibility for various uses, such as furniture finishes.

*Example 2*

A polymerization product of a mixture of the hydrocarbons obtained by the reduction of one molecule of divinyl acetylene with 2 molecules of hydrogen is used directly, or after dilution with up to 50% of xylene, as a coating composition. The resulting films possess satisfactory flexibility for various uses, such as furniture finishes.

*Example 3*

500 grams of a 50% xylene solution of a mixture of the polymerizable polymers of divinyl acetylene and a tetramer of acetylene is mixed with 25 grams of oleic acid. Films formed from the resulting mixture are more flexible than those formed from the polymers alone.

*Example 4*

500 grams of a mixture of one part by weight of a non-volatile polymerizable polymer of divinyl acetylene and 3 parts by weight of unchanged divinyl acetylene is mixed with 25 grams of oleic acid. The resulting films are of the same flexibility as those of Example 3.

*Example 5*

500 grams of a solution of polymerized acetylene polymers, similar to that used in Example 3, is mixed with 25 grams of dibutyl phthalate and then ground in a pebble mill with 350 grams of zinc oxide for 2 days. The dibutyl phthalate improves the flexibility of the resulting white enamel.

*Example 6*

500 grams of a solution of polymerized acetylene polymers, such as used in Example 3, is mixed with 25 grams of China wood oil, and 25 grams of ester gum dissolved in 25 grams of xylene. The resulting films have better flexibility than those of Example 2.

*Example 7*

500 grams of a solution of polymerized acetylene polymers, such as used in Example 3 and containing approximately 50% of film-forming material, is mixed with 100 grams of a 50% solution of meta styrene in xylene. The resulting composition is more viscous and therefore more suitable for application by brushing than that of Example 3. The films also show improved adhesion to metal.

Example 8

500 grams of a 50% butyl acetate solution of a mixture of the polymerizable polymers of divinyl acetylene and a tetramer of acetylene is mixed with 25 grams of meta styrene dissolved in 50 grams of butyl acetate. The resulting coating composition has a viscosity and an adhesion to metal similar to those of Example 7.

Example 9

To 1000 grams of a solution of film-forming polymers, such as used in Example 3 and containing 50% of film-forming material, 0.5 grams of eugenol is added. The resulting composition shows a reduced tendency to set to a gel on long storage in contact with air.

The divinyl acetylene referred to above is preferably prepared by mixing 945 parts by weight of ammonium chloride, 1000 parts by weight of water, 2850 parts by weight of cuprous chloride, and 100 parts by weight of copper powder, and agitating this mixture thoroughly while passing into it acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass.

In the preparation of divinyl acetylene by the method indicated above the resulting product contains a tetramer of acetylene in amounts of from 25–40%, the higher amounts of the tetramer being obtained when part of the divinyl acetylene is removed by distillation.

The divinyl acetylene and other hydrocarbons thus obtained may be converted into synthetic drying oil in various ways, as set forth in my co-pending application Serial No. 384,238 filed of even date herewith, but two suitable methods, for purposes of illustration, are as follows:

Process A 1000 grams of pure divinyl acetylene is boiled at atmospheric pressure and in the presence of air for 4 hours in a vessel provided with a condenser for the return of the condensed vapors to the reaction. The temperature of the boiling liquid is between 85° and 90° C. At the end of 4 hours the unchanged divinyl acetylene is distilled off under reduced pressure. There remains, in 12 to 18% yield, a viscous non-volatile residue having the general properties of a bodied drying oil and consisting of the polymerized divinyl acetylene. This may be thinned to a viscosity suitable for application by brushing, spraying, etc. by the addition of solvent naphtha.

Process B 1000 grams of crude divinyl acetylene containing 25% of a tetramer of acetylene is boiled at 75–80° C., at atmospheric pressure, under a reflux condenser and in an atmosphere of nitrogen for 5 hours. The resulting solution of polymers in unchanged hydrocarbons is used directly or is treated as follows: 1000 grams of xylene is added and the mixture is subjected to fractional distillation in vacuo. The unchanged portion of the original material may thus be almost completely removed, leaving most of the xylene behind as a solvent for the resulting synthetic drying oil. This solution is a clear reddish orange liquid of relatively low viscosity, having good drying properties and usually requiring no thinning before use. The yield is approximately 50% based on the original acetylene mixture and this yield is independent of the optional treatment with xylene.

I have found that the presence of the tetramer, which is believed to be butadienyl vinyl acetylene, is desirable inasmuch as it increases the yield of synthetic drying oil.

Although the above examples are limited to the use of divinyl acetylene and a tetramer of acetylene, and reduction products of divinyl acetylene, other unsaturated hydrocarbons, such as other polymerizable polymers of acetylene and other partial reduction products containing at least two unsaturated bonds, or the homologs or isomers of these compounds, may be used. Thus, I may employ such compounds as butadiene and its homologs dimethyl butadiene, isoprene, piperylene, and the like as well as compounds of the type of dipropargyl, which contain triple bonds but no double bonds. Furthermore, it is not necessary to use pure compounds in making the synthetic drying oils. In fact, as indicated above, it is sometimes advantageous to polymerize mixtures of unsaturated hydrocarbons. Thus, as indicated above, I may first partially hydrogenate divinyl acetylene to a mixture containing such compounds as divinyl ethylene, vinyl ethyl ethylene, and vinyl ethyl acetylene, and then polymerize this mixture. Hydrocarbons discussed in this paragraph will be referred to generally as polymerizable aliphatic hydrocarbons containing at least two unsaturated bonds although the preferred hydrocarbons, as indicated in the examples, contain three unsaturated bonds.

As indicated by the above examples, the synthetic drying oils obtained may be used in a wide variety of coating compositions, either directly or after mixture with other substances. In either case, the material may be applied by brushing, spraying, dipping, or any other method of application used for varnishes and lacquers, and the resulting films are completely resistant to the action of water, organic solvents, strong acids and alkalies.

In order that the synthetic drying oils may be used to form the most desirable coating compositions, I may control their flexibility, viscosity, and drying characteristics either during or after polymerization. Thus, the flexibility may be increased by the addition of rubber softeners, such as oleic acid used in Example 3 above. The viscosity may be increased by the addition of synthetic resins, like meta styrene, or other viscous, film-forming material which is compatible with the synthetic drying oils, or it may be decreased by dilution with solvents, such as xylene, acetone or butyl acetate, in the usual manner, or by the addition of small amounts of amines.

These synthetic drying oils dry and harden in thin films, without substantial loss of weight (not over 1%), on exposure to air at ordinary or elevated temperatures. The rate at which the films dry may be increased by the addition of driers, such as soluble compounds of lead, cobalt, and manganese. Because of the rapid absorption of oxygen by these synthetic drying oils, it has been found advantageous in some cases to add a small amount of an antioxidant, e. g., eugenol, in order to reduce the tendency to skin and solidify in the container. The amount of antioxidant used is controlled so that it does not alter the thin film drying rate to an objectionable degree for practical purposes. The properties of the films may be altered further by the admixture of natural drying oils, natural gums, synthetic resins, and the like. Pigments and other coloring materials may also be incorporated by the usual methods.

If the unchanged portion of the original material is distilled off after the heat polymerization step in the formation of the synthetic drying oil, the resulting product is a liquid non-volatile polymerization product of acetylene, thin films of which will dry and harden on exposure to air without substantial loss of weight (not over 1%). On the other hand, if desired, the unchanged original material may be allowed to remain in contact with the polymer and the mixture used in coating compositions. In the latter event, the unchanged material may replace a portion of the solvent which would otherwise be used in the coating composition.

It will therefore be apparent that I have developed a new class of coating compositions which form films that dry more rapidly and harder than films containing natural drying oils, and that these films are completely resistant to the action of water, organic solvents, strong acids and alkalies when they contain the proportions of acetylene polymers set forth herein or greater proportions of these polymers.

No claims are made herein to the synthetic drying oils themselves or the method of making them inasmuch as this subject matter is disclosed and claimed in my co-pending application filed of even date herewith, referred to above.

By the term "non-volatile", as used herein, I mean that when heated to 100° C., at a pressure corresponding to 35 mm. of mercury, nothing is distilled off.

By the term "completely resistant", as used herein, I mean that the films in question are not substantially dissolved, softened, or disintegrated by exposure to water, organic solvents, strong acids or alkalies at ordinary temperatures.

As many apparently widely different embodiments of this invention may be made without departing from the spirit and scope thereof, it is to be understood that I do not limit myself to the specific embodiments thereof except as defined in the appended patent claims.

I claim:

1. A coating composition mixture including as an ingredient a preformed drying oil which is a liquid non-volatile open chain polymerization product of acetylene.

2. A coating composition mixture including as an ingredient a preformed drying oil which is a liquid non-volatile open chain polymerization product of a material containing divinyl acetylene.

3. A coating composition mixture including as an ingredient a preformed drying oil which is a liquid non-volatile open chain polymerization product of a material containing divinyl acetylene and a tetramer of acetylene.

4. A coating composition comprising a drying oil which is a liquid non-volatile open chain polymerization product of acetylene and other film-forming material.

5. A coating composition comprising a drying oil which is a liquid non-volatile open chain polymerization product of acetylene, other film-forming material, and added diluent.

6. A coating composition comprising a solution containing at least 50% of an open chain polymerized acetylene polymer.

7. A coating composition comprising a synthetic oily non-volatile polymerizable polymer of a hydrocarbon containing at least two unsaturated bonds, said polymer being adapted to harden without substantial loss in weight on exposure to air.

8. A coating composition comprising in admixture a synthetic drying oil, which is a liquid non-volatile open chain polymerization product of acetylene, and a natural drying oil.

9. A coating composition comprising in admixture a synthetic drying oil, which is a liquid non-volatile open chain polymerization product of acetylene, and China wood oil.

10. A coating composition comprising in admixture a synthetic drying oil, which is a liquid non-volatile open chain polymerization product of acetylene and a synthetic resin.

11. A coating composition comprising in admixture a synthetic drying oil, which is a liquid non-volatile open chain polymerization product of acetylene, and meta styrene.

12. A coating composition comprising in admixture a synthetic drying oil, which is liquid non-volatile open chain polymerization product of acetylene, and a natural gum.

13. A coating composition comprising in admixture a syntheic drying oil, which is a liquid non-volatile open chain polymerization product of acetylene, and ester gum.

In testimony whereof, I affix my signature.

ARNOLD M. COLLINS.